(12) United States Patent
Fulmer et al.

(10) Patent No.: US 8,708,365 B2
(45) Date of Patent: Apr. 29, 2014

(54) SIDE CURTAIN AIRBAG ASSEMBLY

(75) Inventors: Brian Fulmer, Hooper, UT (US); Alex S. Damman, Dublin, OH (US); Rebecca Ann DeAguiar, Middleboro, MA (US)

(73) Assignee: Autoliv ASP, Inc., Ogden, UT (US)

( * ) Notice: Subject to any disclaimer, the term of this patent is extended or adjusted under 35 U.S.C. 154(b) by 471 days.

(21) Appl. No.: 12/696,430

(22) Filed: Jan. 29, 2010

(65) Prior Publication Data

US 2011/0187086 A1    Aug. 4, 2011

(51) Int. Cl.
| | |
|---|---|
| *B60R 21/213* | (2011.01) |
| *B60R 21/232* | (2011.01) |
| *B60R 21/237* | (2006.01) |
| *B60R 21/2346* | (2011.01) |
| *B60R 21/233* | (2006.01) |

(52) U.S. Cl.
CPC ............ *B60R 21/213* (2013.01); *B60R 21/232* (2013.01); *B60R 21/237* (2013.01); *B60R 21/2346* (2013.01); *B60R 2021/23308* (2013.01)
USPC ............ 280/728.2; 280/729; 280/730.2; 280/740; 280/743.1

(58) Field of Classification Search
CPC .. B60R 21/213; B60R 21/232; B60R 21/231; B60R 21/233; B60R 2021/23308; B60R 21/2346; B60R 21/237
USPC .......... 280/730.2, 743.1, 743.2, 729, 730.1, 280/728.2, 740
See application file for complete search history.

(56) References Cited

U.S. PATENT DOCUMENTS

| | | |
|---|---|---|
| 5,794,971 A | 8/1998 | Boydston et al. |
| 6,045,151 A | 4/2000 | Wu |
| 6,106,006 A | 8/2000 | Bowers et al. |
| 6,145,879 A | 11/2000 | Lowe et al. |
| 6,338,498 B1 | 1/2002 | Niederman et al. |
| 6,481,743 B1 | 11/2002 | Tobe et al. |
| 6,481,744 B2 | 11/2002 | Melia |
| 6,626,456 B2 | 9/2003 | Terbu et al. |
| 6,676,154 B2 | 1/2004 | Fischer |
| 6,808,199 B2 | 10/2004 | Saderholm et al. |
| 6,830,262 B2 | 12/2004 | Sonnenberg et al. |
| 6,883,827 B2 | 4/2005 | Keshavaraj |
| 7,083,188 B2 * | 8/2006 | Henderson et al. ......... 280/730.2 |
| 7,931,293 B2 * | 4/2011 | Slaats et al. ................ 280/730.2 |
| 8,414,014 B2 * | 4/2013 | Nogami et al. ............ 280/728.2 |
| 2003/0006591 A1* | 1/2003 | Yasuhara et al. ........... 280/730.2 |

(Continued)

FOREIGN PATENT DOCUMENTS

| | | |
|---|---|---|
| DE | 10331133 | 1/2004 |
| EP | 0980796 A2 | 2/2000 |
| EP | 1637408 A2 | 3/2006 |

*Primary Examiner* — Ruth Ilan
*Assistant Examiner* — George Spisich
(74) *Attorney, Agent, or Firm* — Brinks, Gilson & Lione

(57) ABSTRACT

In at least one embodiment, a side curtain airbag assembly for protecting an occupant of a vehicle is provided. The side curtain airbag assembly comprises an inflatable cushion configured to be installed between a roof rail and an upper vehicle trim of the vehicle. The inflatable cushion is deployable from an uninflated state to an inflated state by gas from a gas generator. The inflatable cushion includes a side protection panel having an upper perimeter portion and one or more sub chambers. The sub chambers inflate downward from the upper perimeter portion. An upward deploying chamber is in fluid communication with the side protection panel and inflates upward between the roof rail and the upper vehicle trim.

22 Claims, 6 Drawing Sheets

(56) References Cited

U.S. PATENT DOCUMENTS

| | | |
|---|---|---|
| 2003/0188979 A1 | 10/2003 | Saderholm et al. |
| 2004/0007857 A1 | 1/2004 | Sonnenberg et al. |
| 2005/0110256 A1* | 5/2005 | Crookston et al. ......... 280/743.1 |
| 2006/0186652 A1* | 8/2006 | Sunabashiri ................. 280/740 |
| 2006/0192368 A1* | 8/2006 | Hall et al. .................. 280/730.2 |
| 2007/0075530 A1* | 4/2007 | Yokoyama ................. 280/730.2 |
| 2007/0090630 A1* | 4/2007 | Wilmot ...................... 280/728.2 |
| 2007/0126221 A1* | 6/2007 | Yoshida ..................... 280/743.1 |
| 2008/0258442 A1* | 10/2008 | Quach et al. ............... 280/730.2 |
| 2009/0243267 A1* | 10/2009 | Fletcher et al. ............ 280/730.2 |

* cited by examiner

BEFORE CRASH
(t = 0)

DURING HEAD MOVEMENT
(t = 25ms)

SIDE CURTAIN AIRBAG ASSEMBLY

BACKGROUND OF THE INVENTION

1. Field of the Invention

The present invention relates generally to a vehicle safety restraint system and more particularly, to a side curtain airbag for protecting an occupant of a vehicle.

2. Background

Motor vehicles are commonly provided with airbag cushions for protecting a vehicle occupant. Gas generating inflators inflate the airbag cushions when predetermined vehicle conditions are sensed, such as for example, deceleration of a vehicle when it exceeds a predetermined threshold. Many of these airbag systems include inflatable restraint cushions which are attached to the vehicle frame along the roof rail of a vehicle frame so as to extend downwardly in a substantially curtain-like fashion between an occupant and the side portions of the vehicle when deployed. Such coverage is intended to provide cushioning restraint for the occupant during, for example, a side impact collision event. These curtain-like structures often called side curtain airbags thereby provide protection to the vehicle occupant in the regions below the roof rail of the vehicle. In particular, the protection afforded by such downwardly deployed curtain-like structures extends substantially in the region below the zone of attachment of the airbag along the roof rail.

Recently, some motor vehicles have been styled with roof lines having relatively more dramatic slope. For example, the rear portion of the exterior of the passenger compartment of a vehicle may slope substantially downward to provide a more aerodynamic shape to the vehicle. As such, the rear portion of the interior of the passenger compartment may correspondingly slope substantially downward, and in particular, the position of the head of a rear seated occupant may be high relative to the position of the roof rail. Current side curtain airbag designs may not optionally address this condition and accordingly, further improvements and enhancements to side airbags may be desirable.

BRIEF SUMMARY OF THE INVENTION

In at least one embodiment of the present invention, a side curtain airbag assembly for protecting an occupant of a vehicle is provided. The vehicle has a roof rail and an upper vehicle trim, such as for example, a roof head liner that covers the roof rail. The side curtain airbag assembly comprises an inflatable cushion that is configured to be installed between the roof rail and the upper vehicle trim. Gas produced by a gas generator is used to deploy the inflatable cushion from an uninflated state to an inflated state. The inflatable cushion includes a side protection panel that has an upper perimeter portion and one or more sub chambers which receive the gas during deployment to inflate downward from the upper perimeter portion. A plurality of attachment features are disposed adjacent to the upper perimeter portion and are for attaching the inflatable cushion along the roof rail. An upward deploying chamber is in fluid communication with the side protection panel and receives the gas during deployment, inflating upward from a section of the upper perimeter portion that is positioned below the attachment features to inflate above the attachment features between the roof rail and the upper vehicle trim.

In one aspect of the invention, the upward deploying chamber is configured to be positioned laterally of the head of the occupant. The upward deploying chamber inflates upward from the section of the upper perimeter portion of the side protection panel between the roof rail and the upper vehicle trim to provide lateral protection to the head of the occupant. The inflatable cushion further includes a plurality of tabs extending upwardly from the upper perimeter portion. The tabs have the attachment features and are spaced apart from each other and from the upward deploying chamber.

Further objections, features, and advantages of the invention will become apparent from consideration of the following description and the appended claims when taken in connection with the accompanying drawings.

BRIEF DESCRIPTION OF THE DRAWINGS

FIG. 4b is a second step in the stepwise sequence referred to in FIG. 4a;

FIG. 4c is a third step in the stepwise sequence referred to in FIG. 4a;

FIG. 4d is a forth step in the stepwise sequence referred to in FIG. 4a;

DETAILED DESCRIPTION OF THE INVENTION

Detailed embodiments of the present invention are disclosed herein. It is understood, however, that the disclosed embodiments are merely exemplary of the invention and may be embodied in various and alternative forms. The figures are not necessarily to scale; some figures may be configured to show the details of a particular component. Therefore, specific structural and functional details disclosed herein are not to be interpreted as limiting but merely as a representative basis for the claims and for teaching one skilled in the art to practice the present invention.

Figure 1:
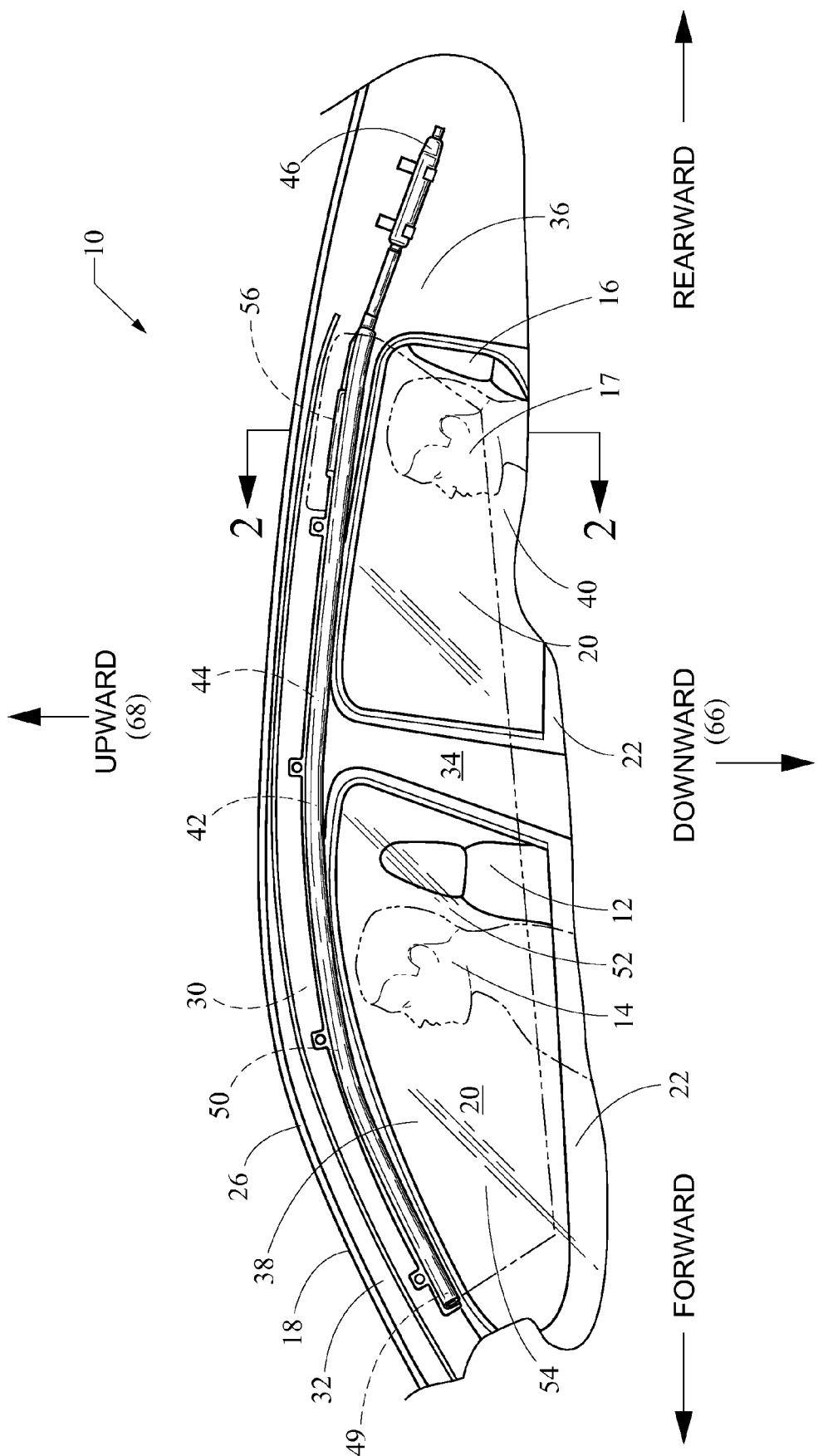
FIG. 1 is a cut-away view of a vehicle incorporating a side curtain airbag assembly in accordance with an embodiment of the present invention.

Referring now to FIG. 1, at least one embodiment of a side curtain airbag assembly 42 for protecting an occupant of a vehicle is provided. The vehicle 10 includes a front seat 12 which may be used to support a front seated vehicle occupant 14. The vehicle 10 also includes a rear seat 16 which may be used to support a rear seated occupant 17. While the front seat 12 and the rear seat 16 are illustrated as being located on the driver's side of the vehicle 10, it is to be appreciated that the present invention is also useful in the protection of an occupant seated in either the front seat or the rear seat on the passenger side of the vehicle 10.

In order to provide visibility for the occupants of the vehicle 10, the vehicle 10 is provided with a windshield 18 as well as with one or more side windows 20. As illustrated, the side windows 20 are located generally adjacent to the seats 12 and 16 and to the sides of the occupants 14 and 17 seated therein. The vehicle 10 preferably includes one or more doors 22 which extend towards a roof 26 adjacent to the vehicle occupants 14 and 17.

The vehicle 10 includes a structural frame formed from an arrangement of structural support members including a roof rail 30 disposed at the intersection between the doors 22 and the roof 26. The vehicle 10 also includes a series of structural support pillars 32, 34, and 36 which extend downwardly from the roof rail 30. Structural support pillar 32 which extends between the windshield 18 and the side window 20 adjacent to the front seat 12 (towards a front position 38 of the vehicle 10) is commonly referred to as the "A" pillar. The structural support pillar 34 which is disposed intermediate the side windows 20 is commonly referred to as the "B" pillar. The structural support pillar 36 which is disposed rearward of the side windows 20 adjacent to the rear seat 16 (towards a rearward position 40 of the vehicle 10) is commonly referred to as the "C" pillar. Each of the structural support pillars 32, 34, and 36 are preferably covered by a trim piece which extends in an elongated form away from the roof rail 30. The roof rail 30 is likewise preferably covered by an upper vehicle trim 39 or a headliner material as shown in FIGS. 2a and 2b.

Figure 2A:
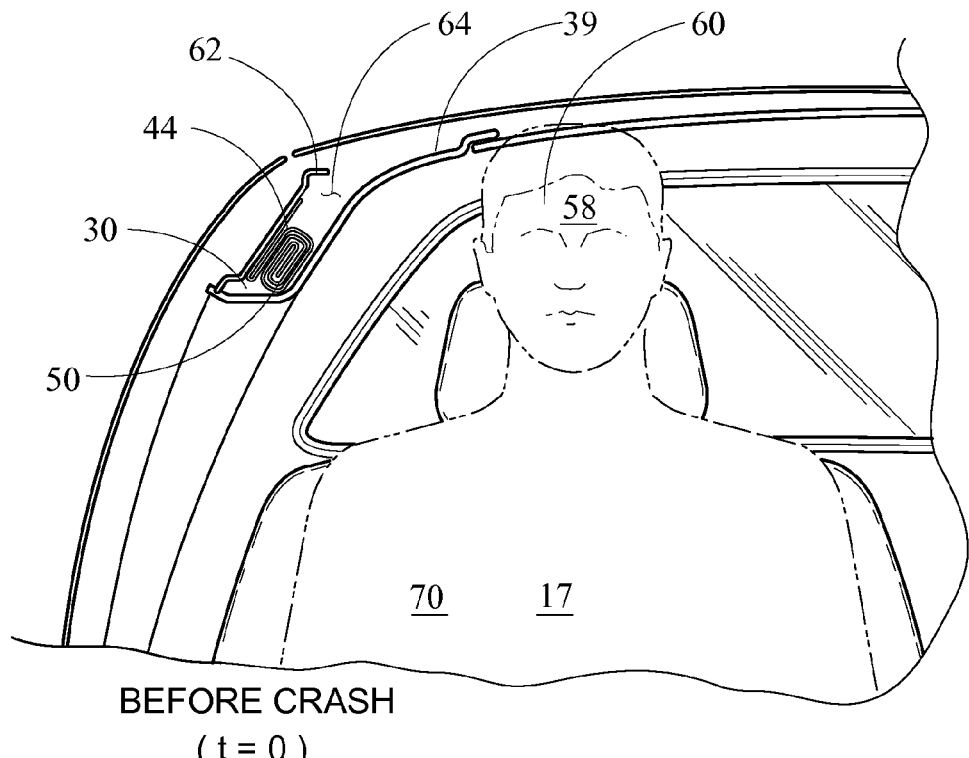
FIG. 2a is a cross-sectional view of the side curtain airbag assembly depicted in FIG. 1 in a stowed state.
Figure 2B:
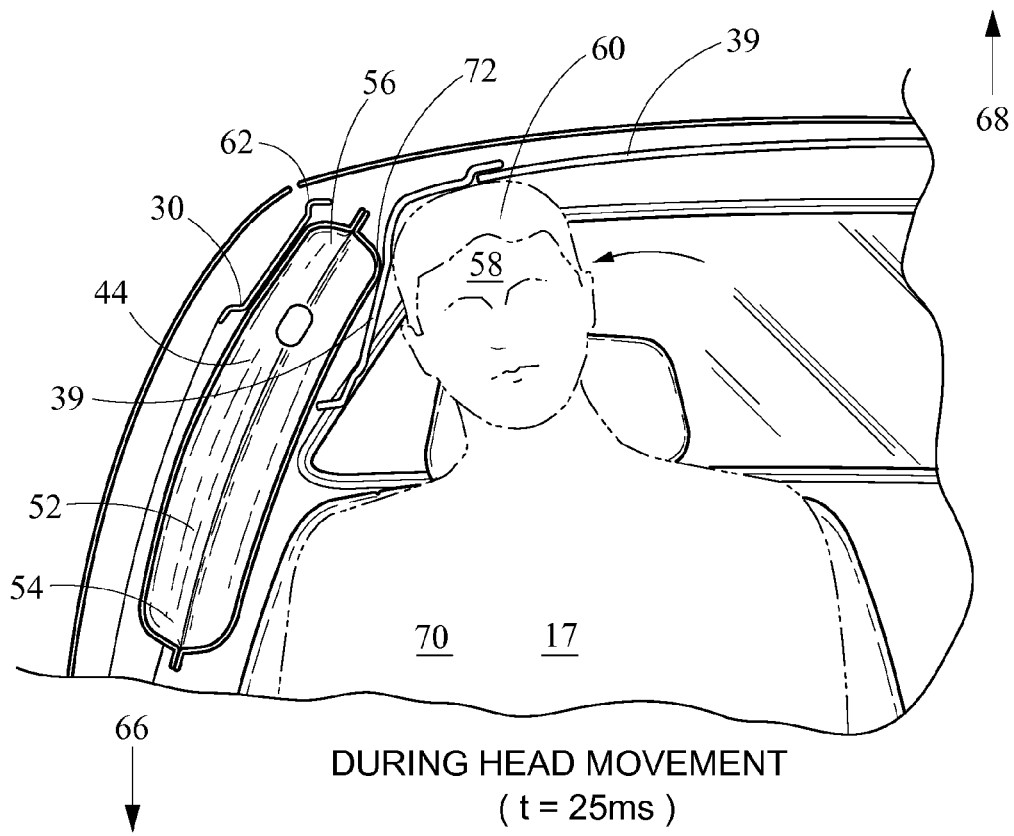
FIG. 2b is a cross-sectional view of the side curtain airbag assembly depicted in FIG. 1 in a deployed state.

As illustrated in FIG. 1, a side curtain airbag assembly 42, which includes an inflatable cushion 44, may be stored (i.e. stowed in the vehicle 10) in a rolled and/or folded fashion in attached relation to the vehicle frame along at least a portion of the roof rail 30 and is preferably at least partially covered by the upper vehicle trim 39 (see FIGS. 2a and 2b). In one embodiment, a portion of the side curtain airbag 42 is stored along portions of the A pillar 32 and/or along portions of the C pillar 36.

As shown, the inflatable cushion 44 is in fluid communication with a gas generator 46 for deploying the inflatable cushion 44 from an uninflated state 50 (as stowed) to an inflated state 52 (dashed lines). More specifically, gas may be discharged from the gas generator 46 into an inlet opening 48 (see FIG. 3) of the inflatable cushion 44 to effect inflation of the inflatable cushion 44. The inflatable cushion 44 includes a side protection panel 54 and an upward deploying chamber 56 that is in fluid communication with the side protection panel 54. As illustrated, the side protection panel 54 is driven downward 66 while the upward deploying chamber 56 is driven upward 68 during inflation of the cushion 44.

The inflatable cushion 44 may also be attached to tethering elements 49 disposed at locations (e.g. generally proximate forward and rearward positions 38 and 40) to promote the desired deployment path for the inflatable cushion 44 upon inflation by the gas generator 46. As will be appreciated, the inflatable cushion 44, gas generator 46, and tethering elements 49 are preferably hidden from view by the overlying trim (e.g. upper vehicle trim 39 and corresponding "A" and "C" pillar trim). Accordingly, prior to activation the inflatable cushion 44 and tethering elements 49 are substantially hidden from view.

Referring to FIG. 2a, a cross-sectional view of the inflatable cushion 44 in an uninflated, stowed state 50 is provided. This state 50 may correspond to the state of the cushion 44 prior to an accident event or prior to sensing an impending accident event (e.g. time before crash=0). The stowed cushion 44 is illustrated as being installed between the roof rail 30 and the upper vehicle trim 39 at a position adjacent to the head 58 of an occupant but at a level below the upper portion 60 of the occupant's head 58. This arrangement for example may correspond to an occupant 17 seated in the rear seat 16 of a passenger compartment of a vehicle 10 that has a relatively steep rearward sloping roof 26 (and corresponding steep rearward sloping roof rail 30). Notably, an upper portion 62 of the roof rail 30 extends above where the stowed cushion 44 is attached to the roof rail 30 and forms a narrow space 64 with the upper vehicle trim 39. Moreover, the upper portion 62 of the roof rail 30 corresponds laterally to the upper portion 60 of the occupant's head 58 and thus, only the upper vehicle trim 39 currently obstructs the upper portion 60 of the occupant's head 58 from moving laterally into the upper portion 62 of the roof rail 30.

Referring to FIG. 2b, a cross-section view of the inflatable cushion 44 in an inflated state 52 is provided. This state 52 may correspond to the state of the cushion 44 subsequent to sensing an accident event or impending accident event, such as for example at time=25 milliseconds (ms) from sensing the accident event. As mentioned above, the side protection panel 54 and the upward deploying chamber 56 of the inflatable cushion 44 inflate with gas generated from the gas generator 46. In one example, the side protection panel 54 receives gas from the gas generator 46 and the upward deploying chamber 56, which is in fluid communication with the side protection panel 54, receives gas from the gas generator that is initially fed through a portion of the side protection panel 54. Alternatively, the upward deploying chamber 56 may receive gas directly from the gas generator 46.

The side protection panel 54 inflates downward 66 preferably extending below the upper vehicle trim 39 to be positioned immediately adjacent to the occupant 17. In one example, the side protection panel 54 provides lateral protection to the occupant's body 70 and head 58.

The upward deploying chamber 56 inflates upward 68 from the side protection panel 54 into the narrow space 64 between the roof rail 30 and the upper vehicle trim 39. In this configuration, the inflated upward deploying chamber 56 is disposed between the upper portion 60 of the occupant's head 58 and the upper portion 62 of the roof rail 30, preferably enhancing lateral protection to the occupant's head 58.

In one example, the upward deploying chamber 56 is substantially smaller in size than the side panel 54 (see FIG. 3) and is positioned so as to provide only localized protection for the lateral movement of the occupant's head 58. In this scenario, the upper vehicle trim 39 may be minimally displaced or shifted without rupturing or otherwise becoming damaged during deployment (e.g. expansion of the limited size of the upward deploying chamber 56 into the narrow space 64) cooperatively providing a combined upper vehicle trim-upward deploying chamber protective obstruction 72 between the upper portion 60 of the occupant's head 58 and the upper portion 62 of the roof rail 30, preferably further enhancing lateral protection to the occupant's head 58. That is, the inflated upward deploying chamber 56 due to its limited size remains covered by the upper vehicle trim 39, cooperatively providing the combined protective obstruction 72.

Figure 3:
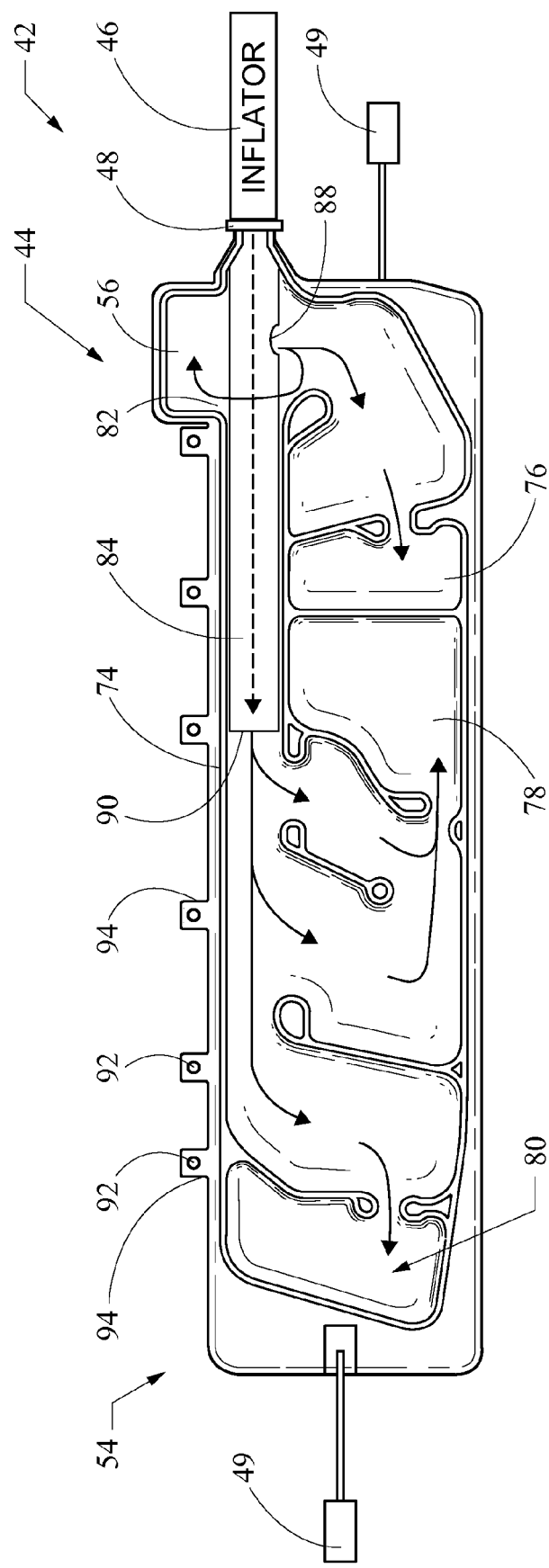
FIG. 3 is a side view of a side curtain airbag assembly in accordance with one embodiment of the present invention.
Figure 4A:
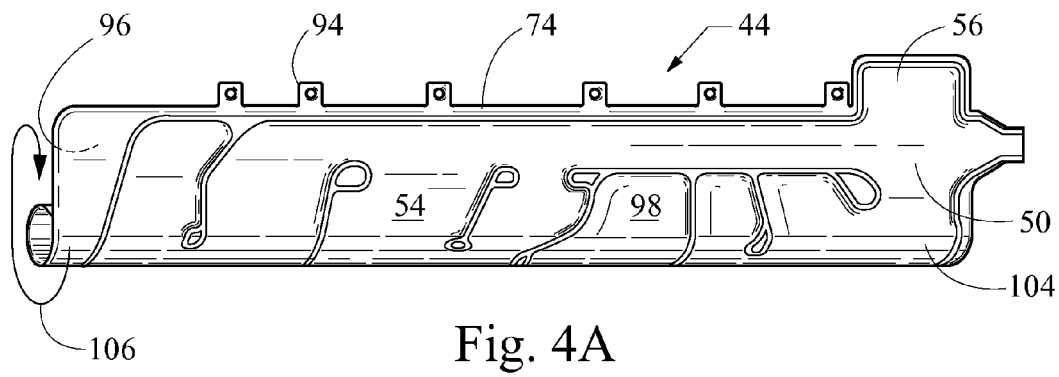
FIG. 4a is a first step in a stepwise sequence for forming a side curtain airbag assembly for stowing in an uninflated state in accordance with an embodiment of the present invention.
Figure 4B:
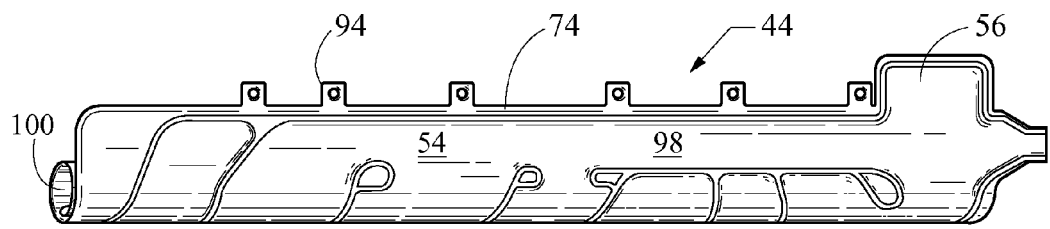
Figure 4C:
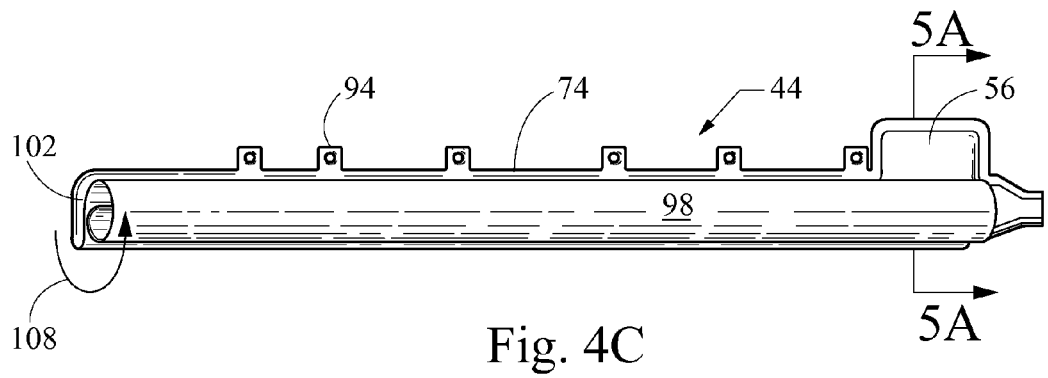
Figure 4D:
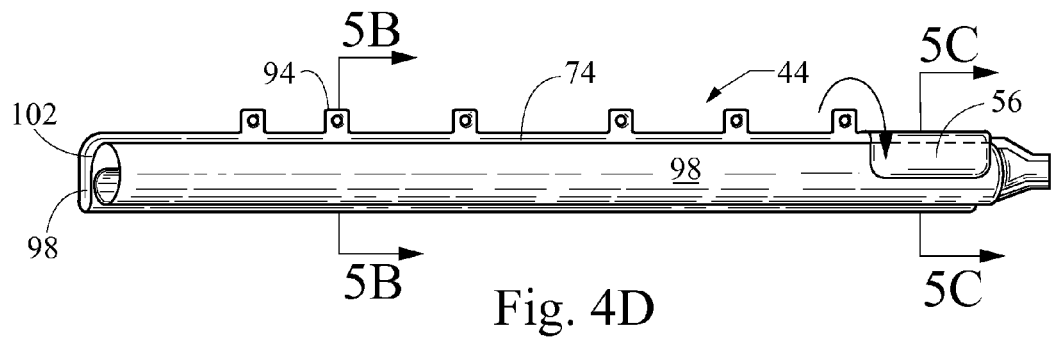

Referring to FIG. 3, a side view of the side curtain airbag assembly 42 is provided. The assembly 42 includes an inflatable cushion 44 that has a side protection panel 54. The side protection panel 54 has an upper perimeter portion 74 and one or more sub-chambers 76, 78 and 80 which receive gas from the gas generator 46 during deployment.

As illustrated, the side panel 54 has rear positioned sub chambers 76 corresponding to the rearward position 40 in the passenger compartment and front positioned sub chambers 80 corresponding to the forward position 38 in the passenger compartment. Disposed between the front and rear sub chambers 80 and 76 are center positioned sub chambers 78. The sub chambers 76, 78 and 80 are in fluid communication with each other. During deployment, the sub chambers 76, 78 and 80 inflate downward from the upper perimeter portion 74 to provide protection to the occupant or occupants 14 and 17.

The inflated cushion 44 has an upward deploying chamber 56 extending from the upward perimeter portion 74 of the side protection panel 54. In one example, the upper deploying chamber is relatively smaller in size than the side protection panel 54 and extends from only a section 82 of the upper perimeter portion 74. As illustrated, the upward deploying chamber 56 is positioned correspondingly towards the rearward position 40 (see FIG. 1) of the passenger compartment and adjacent to the rear seat 16. However, other positions for locating the upward deploying chamber 56 along the upper perimeter portion 74 are envisioned and are within the spirit and scope of the present invention.

The upward deploying chamber 56 receives gas from the gas generator 46 when the inflatable cushion 44 is deployed. The upward deploying chamber 56 inflates upward from the section 82 of the upper perimeter portion 74 between the roof rail 30 and the upper vehicle trim 39 as described in the foregoing paragraphs.

The inflatable cushion 44 has a gas flow duct 84 formed therein with an inlet 48 in fluid communication with the duct 84. The inlet 48 receives the gas generator 46 and the gas flow duct 84 directs the flow of gas from the gas generator 46, e.g., to the various chambers 56, 76, 78 and 80. In the example illustrated, the gas flow duct 84 is positioned adjacent to (e.g. below) the upper perimeter portion 74 and proximate to the upward deploying chamber 56 (e.g. below the section 82). An aperture 88 formed in the duct 84 can be positioned next to the upward deploying chamber to ensure rapid inflation of the upward deploying chamber 56, thereby facilitating upward inflation of the chamber 56. The duct 84 also has at least one other opening 90 which directs gas to the chambers 76, 78 and 80 of the side protection panel 54 during deployment.

The inflatable cushion 44 has a plurality of attachment features 92, e.g., negative or receiving feature—holes and/or slots for receiving positive attachment features or positive features—threaded fasteners, etc., formed therethrough that are adjacent to the upper perimeter portion 74 (e.g., formed in and/or on tabs 94 and above the upper perimeter portion 74) for attaching the inflatable cushion 44 along the roof rail 30. The attachment features 92 and/or the tabs 94 are spaced apart from each other and from the upward deploying chamber 56 and are preferably positioned above and along the upper perimeter portion 74 for attaching the cushion 44 along the length of the roof rail 30 between the forward and rearward positions 38 and 40. In one example in accordance with an embodiment of the present invention, the tabs 94 extend upwardly from the upper perimeter portion 74 facilitating attachment of the airbag assembly 42 (via feature 92) adjacent to an uppermost section of the roof rail 30 which has a dramatically downward sloping roof line.

The side airbag assembly 42 may also include tether elements 49 attached for example to opposing ends of the side panel 54. The tether elements may be used to couple the ends of the cushion to the "A" and "C" pillars for example, and to facilitate the downward inflation of the side panel 54.

Referring to FIGS. 4a-4d and 5a, the inflatable cushion 44 has an outboard side 96 and an inboard side 98 that is opposite the outboard side 96. The inboard side 98 is correspondingly positioned towards the occupants 14 and 17 of the vehicle 10 when the inflatable cushion 44 is in the inflated state 52. Accordingly, the outboard side 96 is positioned towards the door 22 of the vehicle 10 when the cushion 44 is inflated 52.

In the uninflated state 50, e.g., for storage or stowing, the inflatable cushion 44 in one embodiment has a rolled portion 100 and folded portion 102 that extends from the rolled portion 100. A lower section 104 of the side protection panel 54 is opposite the upper perimeter portion 74 is rolled in a direction 106 towards the outboard side 96 to form the rolled portion 100. The folded portion 102 is formed by folding at least the upper perimeter portion 74 back over the rolled portion 100, e.g., via turning up the rolled portion 100 in a direction 108, toward the inboard side 98 of the inflatable cushion 44.

Figure 5A:
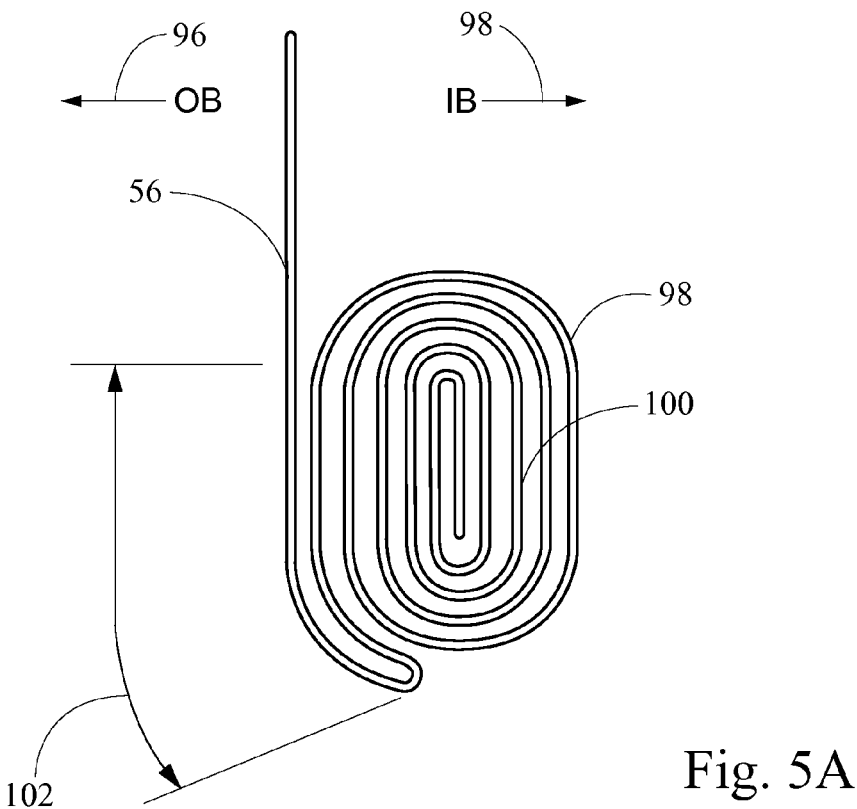
FIG. 5a is a cross-sectional view of one example of the side curtain airbag assembly depicted in FIG. 4c.
Figure 5B:
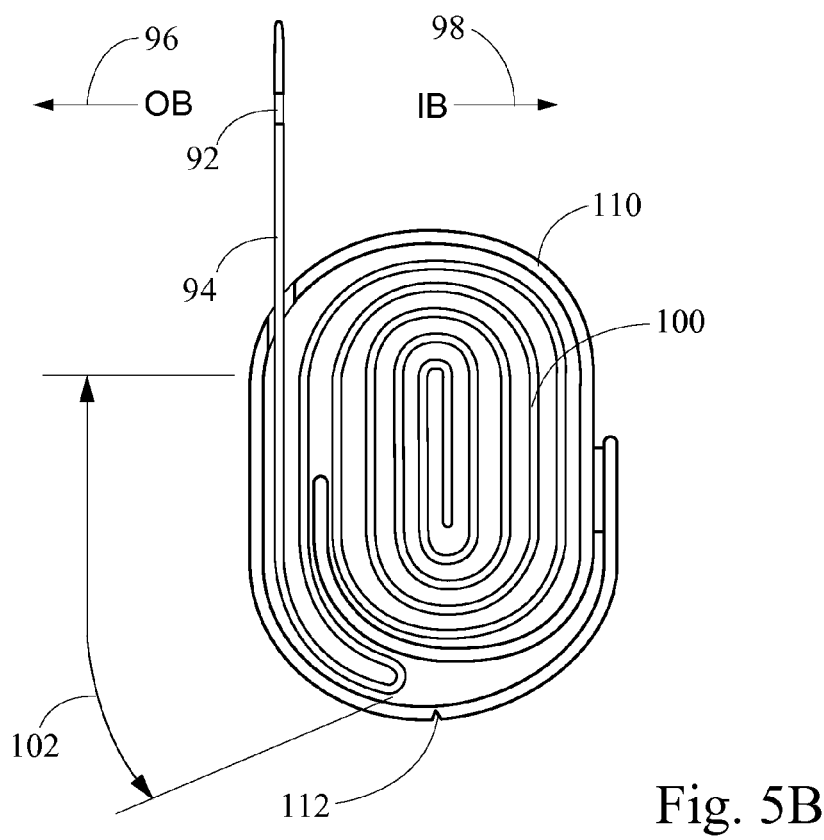
FIG. 5b is a cross-sectional view of another example of the side curtain airbag assembly depicted in FIG. 4d.
Figure 5C:
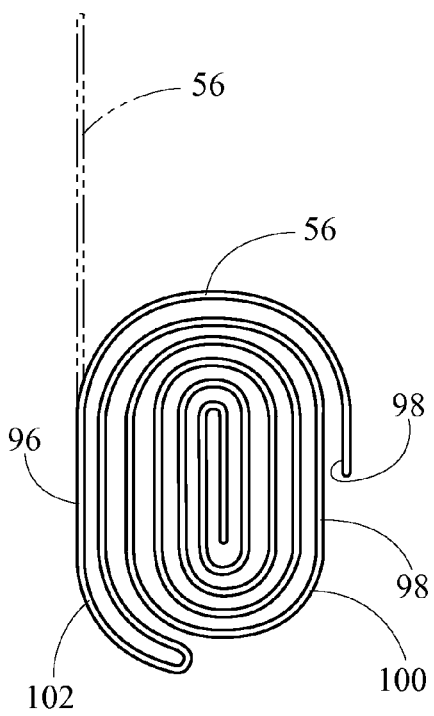
FIG. 5c is a cross-sectional view of one example of the side curtain airbag assembly depicted in FIG. 4d.

Also referring to FIG. 5c, the upward deploying chamber 56 in one example in the uninflated state 50 extends from the folded portion 102 and is wrapped over the rolled portion 100 toward the inboard side 98 of the inflatable cushion 44. In this arrangement, the inboard side 98 of the upward deploying chamber 56 faces toward the inboard side 98 of the rolled portion 100.

Figure 5D:
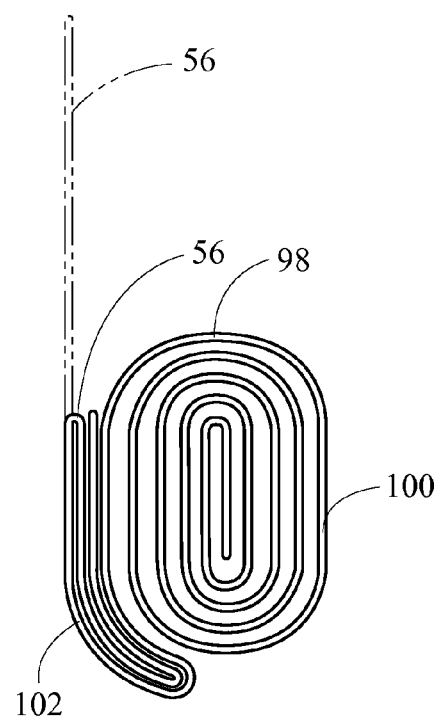
FIG. 5d is a cross-sectional view of another example of the side curtain airbag assembly depicted in FIG. 4d.

Also referring to FIG. 5d, the upward deploying chamber 56 in another example in the uninflated state 50 extends from the folded portion 102 and is folded back towards the inboard side 98 of the inflatable cushion 44 interposed between the folded portion 102 and the rolled portion 100. In this arrangement, the upward deploying chamber 56 is sandwiched between the folded portion 102 and the rolled portion 100.

Figure 5E:
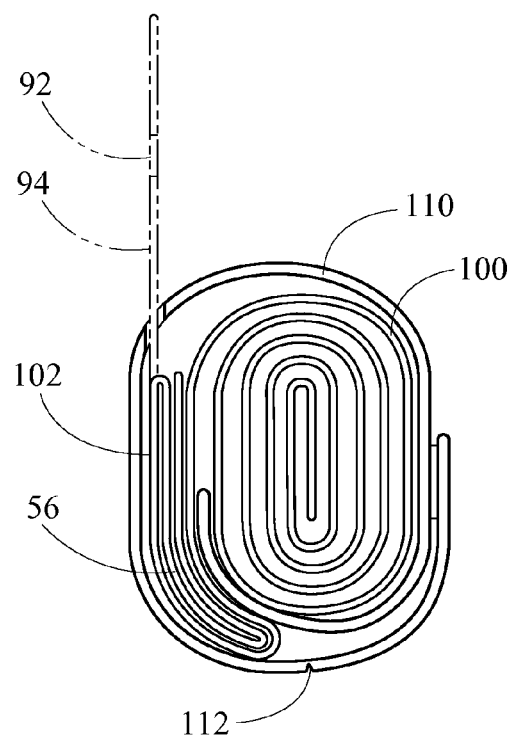
FIG. 5e is a cross-sectional view of yet another example of the side curtain airbag assembly depicted in FIG. 4d.

Also referring to FIGS. 5b and 5e, the inflatable cushion 44 in one example in the uninflated state 50 is covered by a wrapper 110. Packaging the cushion 44 in the wrapper 110 may facilitate installation and stowing of the assembly 42 within the vehicle 10 (e.g. by providing a compact package). The wrapper 110 may be pre-weakened 112 to facilitate releasing the inflatable cushion 44 from the wrapper 110 during deployment. As illustrated in FIG. 5b, the tabs 94, which include the attachment features 92 (e.g. apertures), extend from the folded portion 102 through the wrapper 110 to facilitate attaching the packaged assembly 42 along the roof rail 30 of the vehicle 10.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention, as defined in the following claims.

The invention claimed is:

1. A side curtain airbag assembly for protecting an occupant of a vehicle that has a roof rail covered by an upper vehicle trim, the side curtain airbag assembly comprising:
   an inflatable cushion configured to be installed between the roof rail and the upper vehicle trim and to be deployed from an uninflated state to an inflated state by gas produced from a gas generator, the inflatable cushion including:
   a side protection panel having an upper perimeter portion and one or more sub chambers which receive the gas when the inflatable cushion is deployed, the one or more sub chambers inflating downward from the upper perimeter portion;
   a plurality of attachment features disposed adjacent to the upper perimeter portion for attaching the inflatable cushion along the roof rail;
   an upward deploying chamber in fluid communication with the side protection panel to receive the gas when the inflatable cushion is deployed, the upward deploying chamber inflating upward from a section of the upper perimeter portion that is positioned below the attachment features to inflate above the attachment features between the roof rail and the upper vehicle trim;

wherein the inflatable cushion has an inboard side and an outboard side that is opposite the inboard side, the inboard side being positioned toward the occupant of the vehicle when the inflatable cushion is in the inflated state, and wherein the inflatable cushion in the uninflated state has a rolled portion and a folded portion that extends from the rolled portion, a lower section of the side protection panel that is opposite the upper perimeter portion is rolled in a direction towards the outboard side to form the rolled portion, and the folded portion is formed by folding at least the upper perimeter portion back over the rolled portion toward the inboard side of the inflatable cushion; and wherein the upward deploying chamber in the uninflated state extends from the folded portion, is further folded onto itself with the outboard side of the upward deploying chamber facing inward, and is folded back toward the inboard side of the inflatable cushion interposed between the folded portion and the rolled portion, wherein the inboard side of the upward deploying chamber faces the inboard side of the folded portion and the inboard side of the rolled portion on a second side.

2. The side curtain airbag assembly of claim 1, further comprising
a gas inlet disposed near an end of the upper perimeter portion, the gas inlet being in fluid communication with the sub chambers and the upward deploying chamber; and
a generally tubular gas flow duct for directing the flow of gas, the gas flow duct extending from the gas inlet into the inflatable cushion, the gas flow duct having an axial opening configured to inflate a subset of the several sub chambers, and a radial opening configured to inflate both the upward deploying chamber and at least one of the sub chambers.

3. The side curtain airbag assembly of claim 2, wherein the inflatable cushion is configured to be attached along the roof rail extending between a forward position and a rearward position of the vehicle, the upward deploying chamber being connected to the section of the upper perimeter portion that is proximate to the rearward position.

4. The side curtain airbag assembly of claim 3, wherein the upward deploying chamber inflates to a position corresponding laterally to the head of the occupant when the occupant is positioned in a rear seat of the vehicle.

5. The side curtain airbag assembly of claim 2, wherein the gas flow duct is adjacent to the upper perimeter portion and proximate to the upward deploying chamber facilitating inflation of the upward deploying chamber.

6. The side curtain airbag assembly of claim 5, further comprising the gas generator, wherein the gas generator is also proximate the upward deploying chamber, further facilitating inflation of the upward deploying chamber.

7. The side curtain airbag assembly of claim 2, wherein the upward deploying chamber is positioned in the inflated state to provide lateral protection to the head of the occupant.

8. The side curtain airbag assembly of claim 2, wherein the inflatable cushion has a plurality of tabs that are spaced apart from each other and that extend upwardly from the upper perimeter portion, each of the tabs having an aperture formed therethrough, the apertures defining the attachment features.

9. The side curtain airbag assembly of claim 2, wherein the inflatable cushion has an inboard side and an outboard side that is opposite the inboard side, the inboard side is positioned toward the occupant of the vehicle when the inflatable cushion is in the inflated state, and wherein the inflatable cushion in the uninflated state has a rolled portion and a folded portion that extends from the rolled portion, a lower section of the side protection panel that is opposite the upper perimeter portion is rolled in a direction towards the outboard side to form the rolled portion, and the folded portion is formed by folding at least the upper perimeter portion back over the rolled portion toward the inboard side of the inflatable cushion.

10. The side curtain airbag assembly of claim 9, wherein the upward deploying chamber in the uninflated state extends from the folded portion over the rolled portion toward the inboard side of the inflatable cushion.

11. The side curtain airbag assembly of claim 9, wherein the inflatable cushion in the uninflated state is covered by a wrapper, the wrapper being pre-weakened to facilitate releasing the inflatable cushion from the wrapper during deployment.

12. The side curtain airbag assembly of claim 11, wherein the inflatable cushion has a plurality of tabs extending from the folded portion through the wrapper, the tabs having apertures formed therethrough defining the attachment features.

13. The side curtain airbag assembly of claim 1, further comprising
a plurality of tabs being spaced apart from each other and from the upward deploying chamber, the tabs extending upwardly from the upper perimeter portion and including the attachment features for attaching the inflatable cushion along the roof rail;
a gas inlet disposed near an end of the upper perimeter portion, the gas inlet being in fluid communication with the sub chambers and the upward deploying chamber; and
a generally tubular gas flow duct for directing the flow of gas, the gas flow duct extending from the gas inlet into the inflatable cushion, the gas flow duct having an axial opening configured to inflate a subset of the several sub chambers, and a radial opening configured to inflate both the upward deploying chamber and at least one of the sub chambers.

14. The side curtain airbag assembly of claim 13, wherein the inflatable cushion is configured to be attached along the roof rail extending between a forward position and a rearward position of the vehicle, the upward deploying chamber being connected to the section of the upper perimeter portion that is proximate to the rearward position.

15. The side curtain airbag assembly of claim 13, wherein the gas flow duct is adjacent to the upper perimeter portion and proximate to the upward deploying chamber facilitating inflation of the upward deploying chamber.

16. The side curtain airbag assembly of claim 15, further comprising the gas generator, wherein the gas generator is proximate the upward deploying chamber, further facilitating inflation of the upward deploying chamber.

17. The side curtain airbag assembly of claim 13, wherein the inflatable cushion has an inboard side and an outboard side that is opposite the inboard side, the inboard side positioned toward the occupant of the vehicle when the inflatable cushion is in the inflated state, and wherein the inflatable cushion in the uninflated state has a rolled portion and a folded portion that extends from the rolled portion, a lower section of the side protection panel that is opposite the upper perimeter portion is rolled in a direction towards the outboard side to form the rolled portion, and the folded portion is formed by folding at least the upper perimeter portion back over the rolled portion toward the inboard side of the inflatable cushion.

18. The side curtain airbag assembly of claim 17, wherein the upward deploying chamber in the uninflated state extends from the folded portion over the rolled portion toward the inboard side of the inflatable cushion.

19. The side curtain airbag assembly of claim 17, wherein the upward deploying chamber in the uninflated state extends from the folded portion and is folded back toward the inboard side of the inflatable cushion interposed between the folded portion and the rolled portion.

20. The side curtain airbag assembly of claim 17, wherein the inflatable cushion in the uninflated state is covered by a wrapper, the wrapper being pre-weakened to facilitate releasing the inflatable cushion from the wrapper during deployment.

21. The side curtain airbag assembly of claim 20, wherein the tabs extend from the folded portion through the wrapper for attaching the inflatable cushion along the roof rail via the attachment features.

22. The side curtain airbag assembly of claim 1, wherein the upward deploying chamber has a length extending along the upper perimeter, the fluid communication being formed by an opening between the upward deploying chamber and the side protection panel, the opening extending along the entire length.

* * * * *